United States Patent [19]

Itagaki et al.

[11] Patent Number: 5,409,728
[45] Date of Patent: Apr. 25, 1995

[54] CONFECTIONARY FAT COMPOSITION AND METHOD FOR PRODUCING THE SAME

[75] Inventors: Kazuo Itagaki; Toshiyuki Hirokawa, both of Tokyo, Japan

[73] Assignee: Asahi Denka Kogyo Kabushiki Kaisha, Tokyo, Japan

[21] Appl. No.: 51,989

[22] Filed: Feb. 11, 1993

[30] Foreign Application Priority Data

Feb. 20, 1992 [JP] Japan .................................. 4-033466

[51] Int. Cl.6 .............................................. A23D 9/00
[52] U.S. Cl. .................................... 426/607; 426/606; 426/660
[58] Field of Search .................... 426/607, 606, 660

[56] References Cited

U.S. PATENT DOCUMENTS

| | | | |
|---|---|---|---|
| 4,060,646 | 11/1977 | Bringi | 426/607 |
| 4,199,611 | 4/1980 | Toyoshima | 426/607 |
| 4,234,618 | 11/1980 | Jasko | 426/607 |
| 4,292,338 | 9/1981 | Ainger | 426/607 |
| 4,601,790 | 7/1986 | Stage . | |
| 5,171,604 | 12/1992 | Weyland | 426/607 |

FOREIGN PATENT DOCUMENTS

| | | |
|---|---|---|
| 2745718 | 4/1978 | Germany . |
| 2717602 | 7/1978 | Germany . |
| 2901093 | 7/1979 | Germany . |
| 4122500 | 11/1992 | Germany . |
| 46026823 | 3/1968 | Japan . |
| 46026824 | 3/1968 | Japan . |
| 55-164296 | 12/1980 | Japan . |
| 60-58037 | 4/1985 | Japan . |
| 1-285153 | 11/1989 | Japan . |
| 7801145 | 8/1979 | Netherlands . |

*Primary Examiner*—Carolyn Paden
*Attorney, Agent, or Firm*—Young & Thompson

[57] ABSTRACT

The confectionary fat composition according to the present invention comprises from 20 to 80% by weight of deodorized cocoa butter and from 20 to 80% by weight of hardened fat(s) having a melting point of 45° C. or lower. The method for producing the confectionary fat composition according to the present invention comprises melt-mixing from 20 to 80% by weight of deodorized cocoa butter with from 20 to 80% by weight of hardened fat(s) having a melting point of 45° C. or lower and then rapidly cooling and kneading the obtained mixture.

1 Claim, No Drawings

CONFECTIONARY FAT COMPOSITION AND METHOD FOR PRODUCING THE SAME

BACKGROUND OF THE INVENTION

1. Field of the Invention

This invention relates to a confectionary fat composition containing cocoa butter and suitable for sandwiching or filling in biscuits, cakes and bread, which is excellent in flavor, melting properties, texture, shape retention at ordinary temperature and whipping properties, has a sharp meltability in the mouth and can be used without effecting any tempering treatment, and a method for producing the same.

2. Description of the Prior Art

Cocoa butter, which is hard at ordinary temperature but melts around the bodily temperature, has been used as a fat to be blended mainly in chocolates. However, the triglyceride structure of the cocoa butter makes it necessary to temper this material before the use.

Fat compositions which should be tempered can be hardly whipped and thus good whipping properties can be scarcely obtained in these cases. After the completion of the tempering treatment, namely, the crystal content in a fat rapidly increases and thus whipping on an appropriate crystal content level can be hardly effected. When a fat once solidified is temperature-controlled, the narrow temperature range allowing an appropriate crystal content makes it difficult to achieve uniform whipping properties.

It is, therefore, difficult to use cocoa butter, which should be tempered, as a confectionary fat suitable for sandwiching or filling purposes.

In addition, the application range of cocoa butter is restricted since its characteristic and distinct flavor might throw the flavor of the total products out of balance.

Although Japanese Patent Laid-Open No. 58037/1985 describes a method for producing an air-containing chocolate by rapidly cooling and kneading a chocolate, only a small amount of cocoa butter, if any, is used in this method.

On the other hand, there have been employed vegetable oils and animal fats and hardened products thereof, either alone or as a combination of a number of them, as confectionary fats for sandwiching and filling in, for example, biscuits, cakes and bread.

However these fats suffer from some problems in the melting properties at eating due to the triglyceride compositions thereof. More specifically, when high-melting fats are blended in order to maintain a good shape retention at ordinary temperature, the obtained product shows poor melting properties and a waxy texture at eating. As a result, the flavor of the product is seriously deteriorated and the commercial value thereof is lowered. When no high-melting fat is used in order to improve the melting properties, on the other hand, the obtained product has a poor shape retention at ordinary temperature. In this case, when the temperature is not appropriately controlled during the distribution, the shape and properties of the product are sometimes deteriorated.

SUMMARY OF THE INVENTION

Accordingly, it is an object of the present invention to provide a confectionary fat composition containing cocoa butter and suitable for sandwiching or filling in biscuits, cakes and bread, which is excellent in flavor, melting properties, texture, shape retention at ordinary temperature and whipping properties, has a sharp meltability in the mouth and can be used without effecting any tempering treatment, and a method for producing the same.

The present inventors have successfully found out that a confectionary fat composition, whereby the above-mentioned object of the present invention can be achieved, can be obtained by combining a cocoa butter of an improved color tone and flavor with hardened fat(s) to thereby make the best use of the excellent melting properties of the cocoa butter which has been mainly applied to chocolates only.

The present invention, which has been completed based on the above-mentioned finding, provides a confectionary fat composition comprising from 20 to 80% by weight of deodorized cocoa butter and from 20 to 80% by weight of hardened fat(s) of a melting point of 45° C. or lower.

Further, the present invention provides a method for producing the above-mentioned confectionary fat composition according to the present invention which comprises melt-mixing from 20 to 80% by weight of deodorized cocoa butter with from 20 to 80% by weight of hardened fat(s) of a melting point of 45° C. or lower and then rapidly cooling and kneading the resulting mixture.

The confectionary fat composition of the present invention can be suitably used for sandwiching and filling in biscuits, cakes and bread, since it is excellent in flavor, melting properties, texture, shape retention at ordinary temperature and whipping properties, has a sharp meltability in the mouth and can be used without effecting any tempering treatment.

According to the method of the present invention, further, the above-mentioned confectionary fat composition of the present invention can be obtained.

DETAILED DESCRIPTION OF THE INVENTION

Now the confectionary fat composition of the present invention will be described in detail.

When the confectionary fat composition of the present invention is to be used as, for example, a filling cream of a vanilla or fruity flavor, the characteristic color of cocoa butter is unnecessary. Even if it is to be used as a cream of chocolate flavor, the distinct flavor of cocoa butter is undesirable. In the present invention, therefore, deodorized cocoa butter obtained by deodorizing cocoa butter is employed.

Although the properties and flavor of cocoa butter somewhat vary depending on the production area and type, the production area and type of the cocoa butter are not particularly restricted in the present invention. Further, a mixture of cocoa butter of various types may be used.

The cocoa butter is deodorized by a method commonly used for refining fats, namely, the steam distillation method. The conditions for this treatment are, for example, as follows; at a temperature of from 160° to 200° C., preferably from 170° to 190° C., at a degree of vacuum lower than a usual level, namely 7 mmHg or lower, preferably 5 mmHg or lower, for a period of time of 30 minutes or longer, preferably from 1 hour or longer.

When the deodorizing temperature is lower than 160° C., any sufficient deodorizing effect cannot be obtained.

When the deodorizing temperature exceeds 200° C., on the other hand, the flavor of the obtained confectionary fat composition is deteriorated.

In the present invention, it is preferable to use a cocoa butter which has been deodorized, as described above, and further bleached by the method as will be described hereinafter as the deodorized cocoa butter.

The bleaching can be effected by a method commonly used for refining fats. Usually, cocoa butter is bleached by heating under the atmospheric or reduced pressure in the presence of activated clay. For example, it may be effected by using from 1 to 5% of activated clay at a temperature of 80° to 120° C.

As the deodorized cocoa butter to be used in the present invention, deodorized cocoa butter optionally blended with untreated cocoa butter (undeodorized cocoa butter) may be used, so long as the blend is colorless or pale yellow and has a mild flavor of cocoa butter or scarcely has any flavor or odor.

As the hardened fats to be used in the present invention, those which are obtained by hydrogenating commonly used vegetable oils such as palm oil, soybean oil, rapeseed oil, rice bran oil, cottonseed oil, corn oil, coconut oil or safflower oil and animal fats such as beef tallow, lard, milk fat or fish oil in such a manner as to give a melting point of 45° C. or lower, preferably 40° C. or lower, may be employed.

The use of hardened fat(s) of a melting point of 45° C. or lower makes it possible to give a product having appropriate properties, texture and crystal content. However, it is not preferable to use hardened fat(s) of a melting point exceeding 45° C., since the product thus obtained has poor melting properties and thus its texture is deteriorated.

A blend of two or more hardened fats and a blend of hardened fat(s) together with other fats may be used, so long as the melting point of the fat blend as a whole is 45° C. or lower.

Examples of the other fats include unhardened animal fats and vegetable oils and random transesterified fats.

The confectionary fat composition of the present invention contains from 20 to 80% by weight, preferably from 40 to 70% by weight, of the above-mentioned deodorized cocoa butter and from 20 to 80% by weight, preferably from 30 to 60% by weight, of the above-mentioned hardened fat(s) having a melting point of 45° C. or lower.

When the content of the deodorized cocoa butter is more than 80% by weight and that of the hardened fat(s) of a melting point of 45° C. or lower is less than 20% by weight, the temperature range capable of giving a solid fat content (hereinafter referred to simply as SFC) suitable for the whipping treatment is narrow and thus it is difficult to control the temperature. As a result, the whipping treatment becomes difficult and a low specific gravity cannot be obtained. Thus any stable whipping properties can be scarcely achieved.

When the content of the deodorized cocoa butter is less than 20% by weight and that of the hardened fat(s) of a melting point of 45° C. or lower is more than 80% by weight, it is difficult to simultaneously achieve a good shape retention and a good meltability in the mouth affected by the cocoa butter.

The SFC of the confectionary fat composition of the present invention ranges from 10 to 50%, preferably from 15 to 45%, at 20° C. and from 1 to 20%, preferably from 3 to 10%, at 30° C.

When the SFC of the fat composition at 20° C. exceeds 50%, the low plasticity deteriorates the handling characteristics such as whipping properties and a low specific gravity can be hardly obtained. When the SFC of the fat composition at 30° C. exceeds 20%, the poor whipping and melting properties make it difficult to obtain a sharp meltability in the mouth.

For the purposes of sandwiching and filling, the confectionary fat composition of the present invention is sometimes used in the form of an air-containing product. In such a case, the SFC of the confectionary fat composition in the fat temperature in the bubbling step preferably ranges from 10 to 40%, still preferably from 15 to 30%, in order to bubble a sufficient amount of air thereinto.

When the SFC is smaller than 10%, the amount of fat crystals is insufficient and thus air bubbles cannot be maintained in the fat, which makes it difficult to contain the air. When the SFC exceeds 40%, on the other hand, the excessively large amount of fat crystals lowers the viscosity of the fat, which also makes it difficult to contain the air.

Thus, in the confectionary fat composition of the present invention, it is desirable to control the composition ratio of the deodorized cocoa butter to the hardened fat(s) and the content of other fat(s) so as to allow the SFC to fall within the range as specified above.

Further, it is preferable that the confectionary fat composition of the present invention contains 5% by weight or less, preferably from 0.3 to 3% by weight, of emulsifier(s) as a crystal stabilizer.

Examples of emulsifiers usable herein include glycerol fatty acid esters, sucrose fatty acid esters, sorbitan fatty acid esters, propylene glycol fatty acid esters and lecithin. In particular, it is preferable to use a combination of glycerol fatty acid ester(s) with lecithin, since a confectionary fat composition having improved whipping properties and crystal stability, lightweightness and soft touch can be obtained thereby.

Furthermore, the confectionary fat composition of the present invention may contain seasoning components, if necessary. Examples of these seasoning components include various crystalline sugars such as sucrose, liquid sugars such as starch syrup and water-containing sugar alcohols, dairy products such as whole milk powder and condensed milk, processed egg products such as powdery yolk, processed cocoa butter products such as cocoa powder, sarcocarp jams, concentrated fruit juices, dry fruit powders, dry fruit juice powers, cheeses and nut products such as peanut paste. Furthermore, the confectionary fat composition may optionally contain liquors and perfumes.

Next, the method for producing the confectionary fat composition of the present invention will be described.

The deodorized cocoa butter and the hardened fat(s) having a melting point of 45° C. or lower, each as described above, are melt-mixed and then immediately cooled and kneaded rapidly to thereby give the confectionary fat composition of the present invention.

The rapid cooling and kneading may be effected, for example, by melt-mixing the fats under heating and then rapidly cooling and kneading the fat mixture by using a scraping tube cooler such as a votator, a combinator or a perfector, by cooling the fat mixture with a cooling drum and then kneading it on, for example, a complector, or by rapidly cooling and kneading the mixture in a mixer provided with a stirrer and a cooling device.

In the rapid cooling and kneading step, an inert gas such as nitrogen gas may be bubbled into the fat composition and dispersed therein.

Further, after the completion of the above-mentioned rapid cooling and kneading treatment, the mixture may be subjected to a temperature control treatment at a given temperature (in general, lower than the melting point of the fat mixture by 5° to 10° C.) for a given period of time (in general, 24 to 48 hours) to thereby effect the so-called aging treatment.

The rapid cooling and kneading treatment is effected in order to stabilize crystals. When this treatment is omitted, crystals become coarse and thus no good nor smooth texture can be obtained. In this case, so-called graining frequently occurs and the whipping properties of the composition are adversely affected.

To further illustrate the present invention in greater detail, the following Examples will be given.

Examples 1 to 6 and Comparative Examples 1 to

The fat components and emulsifiers as listed in the following Tables 1 and 2 were melt-mixed together and then rapidly cooled and kneaded on a combinator. The obtained mixtures were aged at a temperature of 25° to 28° C. for 24 hours. Thus each fat composition was obtained. The SFC data of the fat compositions thus obtained at 20° C. and 30° C. are given in the following Tables 1 and 2. As the deodorized cocoa butter, a material obtained by deodorizing cocoa butter by steam-distillation at 180° C. and 1 mmHg for 1 hour was used.

By using these fat compositions, blends of the composition as specified in the following Table 3 were prepared. Each product thus obtained was whipped at a material temperature of 20° to 25° C. with the use of a vertical mixer to thereby give a filling cream. The specific gravity of the filling cream thus obtained was measured and its whipping properties were evaluated. Further, the flavor, meltability in the mouth and shape retention of the obtained filling cream and the occurrence of graining were examined. Regarding shape retention, a filling cream which did not bulge out even when sandwiched between biscuits, allowed to stand at 25° C. for 24 hours and then lightly pressed with fingers was evaluated as good. Regarding grading, the occurrence of graining was observed after allowing each product to stand at 20° C. for 3 weeks. The following Tables 1 and 2 show the results of the evaluation.

As the results given in Table 1 show, filling creams containing the confectionary fat compositions of Examples 1 to 6 according to the present invention were each excellent in flavor, meltability in the mouth, shape retention and whipping properties.

In contrast, as the results given in Table 2 show, the filling cream containing the fat composition of Comparative Example 1, which comprised undeodorized cocoa butter, was undesirable due to its distinct flavor of cocoa butter. The filling cream containing the fat composition of Comparative Example 2 contained a small amount of deodorized cocoa butter and was poor in shape retention and whipping properties. The filling cream containing the fat composition of Comparative Example 3 contained a large amount of deodorized cocoa butter and was poor in whipping properties. Further, the filling cream containing the fat composition of Comparative Example 4, wherein hardened fats of an excessively high melting point were used, was poor in meltability in the mouth and whipping properties.

The evaluation on whipping properties, flavor, meltability in the mouth and shape retention given in the following Tables 1 and 2 was made based on the following evaluation criteria. (1) Whipping properties:
○: specific gravity is 0.8 or below
x: specific gravity exceeds 0.8. (2) Flavor:
○: good, x: poor. (3) Meltability in the mouth:
○: good, Δ: somewhat poor, x: poor. (4) Shape retention:
○: good, Δ: somewhat poor, x: poor.

TABLE 1

| | Example | | | | | |
|---|---|---|---|---|---|---|
| | 1 | 2 | 3 | 4 | 5 | 6 |
| Composition (part) | | | | | | |
| deodorized cocoa butter | 30 | 50 | 70 | 30 | 50 | 50 |
| undeodorized cocoa butter | | | | | | |
| hardened rapeseed oil (m.p. 25° C.) | 70 | 50 | 30 | | | |
| hardened soybean oil (m.p. 35° C.) | | | | 70 | 50 | 20 |
| hardended rapeseed oil (m.p. 60° C.) | | | | | | |
| soybean oil | | | | | | 30 |
| glycerol monooleate | 1 | 1 | 1 | 1 | 1 | 1 |
| lecithin | 0.5 | 0.5 | 0.5 | 0.5 | 0.5 | 0.5 |
| SFC at | | | | | | |
| 20° C. | 12 | 19 | 41 | 45 | 31 | 25 |
| 30° C. | 2 | 2 | 5 | 16 | 4 | 4 |
| Evaluation | | | | | | |
| whipping properties | ○ | ○ | ○ | ○ | ○ | ○ |
| flavor | ○ | ○ | ○ | ○ | ○ | ○ |
| meltability in mouth | ○ | ○ | ○ | ○ | ○ | ○ |
| shape retention | ○ | ○ | ○ | ○ | ○ | ○ |
| occurrence of graining | no | " | " | " | " | " |

TABLE 2

| | Comp. Example | | | |
|---|---|---|---|---|
| | 1 | 2 | 3 | 4 |
| Composition (part) | | | | |
| deodorized cocoa butter | | 10 | 90 | 50 |
| undeodorized cocoa butter | 50 | | | |
| hardened rapeseed oil (m.p. 25° C.) | 50 | 90 | 10 | |
| hardened soybean oil (m.p. 35° C.) | | | | |
| hardened rapeseed oil (m.p. 60° C.) | | | | 50 |
| soybean oil | | | | |
| glycerol monooleate | — | 1 | 1 | 1 |
| lecithin | 0.5 | 0.5 | 0.5 | 0.5 |
| SFC at | | | | |
| 20° C. | 19 | 8 | 60 | 74 |
| 30° C. | 2 | 1 | 8 | 56 |
| Evaluation | | | | |
| whipping properties | ○ | x | x | x |
| flavor | x | ○ | ○ | ○ |
| meltability in mouth | ○ | ○ | ○ | x |
| shape retention | ○ | x | ○ | ○ |
| occurrence of graining | no | " | " | " |

TABLE 3

| fat composition | 65 parts |
|---|---|
| sucrose (passing 300-mesh) | 35 parts |
| vanilla flavor | 0.1 part |

What is claimed is:

1. A method for producing a whippable confectionery fat composition which comprises melt-mixing from 20 to 80% by weight of deodorized untempered cocoa butter with from 20 to 80% by weight of hardened fat(s) having a melting point of 45° C. or lower and then rapidly cooling and kneading the obtained mixture, the deodorized untempered cocoa butter and hardened fat(s) being selected to produce a fat composition having a solid fat content of 10-50% at 20° C. and 1-20% at 30° C.

* * * * *